(12) United States Patent
Tanizawa et al.

(10) Patent No.: US 8,307,200 B2
(45) Date of Patent: Nov. 6, 2012

(54) APPARATUS, METHOD AND COMPUTER PROGRAM PRODUCT FOR AUTHENTICATING COMMUNICATION TERMINAL

(75) Inventors: Yoshimichi Tanizawa, Kanagawa (JP); Naoki Esaka, Kanagawa (JP); Tsutomu Shibata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1079 days.

(21) Appl. No.: 11/826,279

(22) Filed: Jul. 13, 2007

(65) Prior Publication Data

US 2008/0155250 A1 Jun. 26, 2008

(30) Foreign Application Priority Data

Dec. 21, 2006 (JP) .................................. 2006-344001

(51) Int. Cl.
*H04L 29/06* (2006.01)
(52) U.S. Cl. ......... 713/152; 709/223; 709/224; 709/225
(58) Field of Classification Search .................. 713/152; 709/223–225

See application file for complete search history.

(56) References Cited

U.S. PATENT DOCUMENTS

| | | | |
|---|---|---|---|
| 6,463,474 B1 * | 10/2002 | Fuh et al. ........................ | 709/225 |
| 6,609,154 B1 * | 8/2003 | Fuh et al. ........................ | 709/225 |
| 6,654,807 B2 * | 11/2003 | Farber et al. ................... | 709/225 |
| 6,754,212 B1 * | 6/2004 | Terada et al. ................... | 370/389 |
| 6,904,140 B2 * | 6/2005 | Trossen ..................... | 379/207.04 |
| 7,002,973 B2 * | 2/2006 | MeLampy et al. ............. | 370/401 |
| 7,200,400 B2 * | 4/2007 | Creamer et al. ............... | 455/437 |
| 7,568,224 B1 * | 7/2009 | Jennings et al. ................. | 726/14 |
| 7,591,013 B2 * | 9/2009 | Bhargava et al. ................ | 726/14 |
| 7,792,065 B2 * | 9/2010 | Jepson et al. ................... | 370/261 |
| 2003/0236892 A1 * | 12/2003 | Coulombe ..................... | 709/228 |
| 2005/0050194 A1 * | 3/2005 | Honeisen et al. ............. | 709/224 |
| 2005/0058132 A1 * | 3/2005 | Okano et al. ................... | 370/389 |
| 2006/0002351 A1 * | 1/2006 | Madour ......................... | 370/338 |
| 2006/0041742 A1 * | 2/2006 | Oba ............................... | 713/151 |
| 2006/0085545 A1 * | 4/2006 | Borella et al. ................. | 709/227 |
| 2007/0028092 A1 * | 2/2007 | Yegin ............................. | 713/155 |

FOREIGN PATENT DOCUMENTS

| | | |
|---|---|---|
| JP | 2004-328104 | 11/2004 |
| JP | 2005-277815 | 10/2005 |
| JP | 2006-121698 | 5/2006 |
| JP | 2006-311177 | 11/2006 |

(Continued)

OTHER PUBLICATIONS

Rosenberg et al; RFC 3261, IETF; Jun. 2002.*

(Continued)

*Primary Examiner* — Edan Orgad
*Assistant Examiner* — James Turchen
(74) *Attorney, Agent, or Firm* — Finnegan, Henderson, Farabow, Garrett & Dunner, L.L.P.

(57) ABSTRACT

An authentication apparatus includes a first storage unit that stores proxy information containing a proxy ID and capability data, an acquiring unit that acquires the proxy information from the first storage unit, a first transmitting unit that transmits a second message containing the acquired proxy information to a terminal, a receiving unit that receives a third message and authentication data, the third message containing a first proxy ID and setting data from the terminal, and an authentication unit that performs an authentication process based on the authentication data, and a second transmitting unit that transmits the setting data to a server to which a proxy of the first proxy ID relays data communication.

18 Claims, 9 Drawing Sheets

| SIP-PROXY ID | SIP-PROXY NAME | IP ADDRESS | CAPABILITY DATA | |
|---|---|---|---|---|
| | | | Supported HEADER VALUE | Allow HEADER VALUE |
| 011 | proxy-earth | 192.168.1.11 | 100rel, timer, earth | OPTIONS, CANCEL |
| 012 | proxy-mercury | 192.168.1.12 | 100rel, timer, mercury | OPTIONS, CANCEL |
| 013 | proxy-standard | 192.168.1.13 | 100rel, timer | OPTIONS |

151a

FOREIGN PATENT DOCUMENTS

WO  WO 2006/135082 A1  12/2006

OTHER PUBLICATIONS

Roach; RFC 3265; IETF; Jun. 2002.*

Forsberg et al., "Protocol for Carrying Authentication for Network Access (PANA)," pp. 1-60 (Dec. 6, 2006).

Ohba et al., "EAP Pre-authentication Problem Statement," pp. 1-19 (Oct. 2006).

Lior et al., PANA AAA Interworking, pp. 1-32 (Jul. 25, 2005).

Ohba et al., "protocol for Carrying Authentication for Network Access (PANA)," Toshiba Review (2005), pp. 38-41.

* cited by examiner

FIG.4

| SIP-PROXY ID | SIP-PROXY NAME | IP ADDRESS | CAPABILITY DATA | |
|---|---|---|---|---|
| | | | Supported HEADER VALUE | Allow HEADER VALUE |
| 011 | proxy-earth | 192.168.1.11 | 100rel, timer, earth | OPTIONS, CANCEL |
| 012 | proxy-mercury | 192.168.1.12 | 100rel, timer, mercury | OPTIONS, CANCEL |
| 013 | proxy-standard | 192.168.1.13 | 100rel, timer | OPTIONS |

FIG.5

| SIP-TERMINAL ID | AVAILABLE SIP-PROXY ID | | | |
|---|---|---|---|---|
| | 011 | 012 | 013 | 014 |
| 00112233445566 | A | A | A | N/A |
| 00112233445577 | A | A | N/A | N/A |
| 00112233445588 | N/A | N/A | A | A |

FIG.6

| SIP-PROXY ID | NUMBER OF CONNECTED TERMINALS |
|---|---|
| 011 | 20 |
| 012 | 10 |
| 013 | 2 |

| MESSAGE TYPE | | FLAG | } HEADER |
|---|---|---|---|
| Nonce AVP | Cookie AVP | EAP-Payload AVP | } AUTHENTICATION DATA |
| NAP-Information AVP | | ISP-Information AVP* | |
| Protection-Capability AVP | | Algorithm AVP | } NETWORK SETTING DATA |
| PPAC AVP | | Notification AVP | |
| EXTENSION: SIP-Proxy-Information AVP* | | | |

FIG.8

| SIP-PROXY ID |
|---|
| SIP-PROXY NAME |
| CORRESPONDING Supported HEADER VALUE* |
| CORRESPONDING Allow HEADER VALUE* |

FIG.9

| MESSAGE TYPE | FLAG | } HEADER |
|---|---|---|
| Nonce AVP | Cookie AVP | EAP-Payload AVP |
| Auth AVP | ISP-Information AVP* |
| EXTENSION: SIP-Proxy-Information AVP |
| EXTENSION: SIP-Register-Information AVP |
| EXTENSION: SIP-Service-Information AVP* |

- Header
- Authentication Data
- Network Setting Data

FIG.10

| AoR (SIP URI) |
|---|
| CONTACT ADDRESS (SIP URI)* |

FIG.11

| SIP EVENT-TYPE ID |
|---|
| Request-URI FOR EVENT |
| MESSAGE* UNIQUE TO SERVICE |

APPARATUS, METHOD AND COMPUTER PROGRAM PRODUCT FOR AUTHENTICATING COMMUNICATION TERMINAL

CROSS-REFERENCE TO RELATED APPLICATIONS

This application is based upon and claims the benefit of priority from the prior Japanese Patent Application No. 2006-344001, filed on Dec. 21, 2006; the entire contents of which are incorporated herein by reference.

BACKGROUND OF THE INVENTION

1. Field of the Invention

The present invention relates to an apparatus, a method and a computer program product for performing an authentication of a network access of a terminal apparatus by using a signaling protocol.

2. Description of the Related Art

Devices called as authentication agents have been recently used to perform network access authentication. Network access authentication is a process of permitting an access to an internal network from a terminal that is connected to an external network. A communication device that is connected to the external network cannot utilize a service on the internal network until the authentication agent decides that the communication device is authentic.

A session initiation protocol (SIP) is widely known as a signaling protocol that acts between communication devices for controlling or relaying a communication. As a service using the SIP, a communication system such as an Internet telephone system has been developed.

In the communication system using the SIP, after a SIP terminal acting as the communication terminal is authenticated by the authentication agent or the like, the SIP terminal selects a specific proxy out of SIP proxies that relay a communication as an outbound proxy and makes a communication using the outbound proxy.

The outbound proxy receives all SIP messages transmitted from the SIP terminal directly, and transmits a SIP message to the SIP terminal exclusively.

There may be various types of the SIP proxies on a network operated by an association, and a SIP function available for the SIP terminal may vary depending on the types of the SIP proxies. In such a case, the SIP terminal needs to check the SIP function (capability data) of each of the SIP proxies, before the SIP terminal selects the outbound proxy.

According to the conventional technique, because the SIP terminal cannot acquire the capability data of the SIP proxies before the access authentication, the SIP terminal needs to perform a process of searching for a proper SIP proxy having a required capability. The SIP terminal performs the process by, for example, exchanging a SIP OPTIONS request message with a plurality of SIP proxies to be searched at several times.

As described above, if a service of a server is provided via the network, an amount of the pre-processing including the authentication process is usually large. This is why a technique concerning an improvement of such a pre-processing has been proposed.

For example, JP-A 2006-121698 (KOKAI) discloses a method of performing a flexible authentication that is required for utilizing a service provided on a wireless communication network, by performing an authentication process and tunnel setting, that is, a data link for providing the service, using different channels.

However, the pre-processing required for utilizing the service cannot be performed in an effective manner according to the above method. More particularly, it is necessary to acquire addresses of devices to be connected such as a plurality of authentication servers and a plurality of packet-data gateways required for utilizing the service in advance. Moreover, it is impossible to perform a process such as register for utilizing the service in association with the authentication.

The SIP system also has problems that the pre-processing required before starting utilizing the SIP function is ineffective. For example, if it is found that there is no proper SIP proxy having the required capability as a result of the search, the access authentication process and the search process proves fruitless. Even worse, in this case, the SIP terminal additionally requires a process of disconnecting from the network to which the access authentication is performed or another authentication or search process on another network.

In addition, the SIP terminal has to acquire addresses of the SIP proxies in advance to check the capability data of the SIP proxies. Conventionally, such a method is taken that the SIP terminal acquires the addresses of the SIP proxies in advance, or the SIP terminal acquires the addresses using a domain name system (DNS). However, the former method lacks of flexibility. The latter method causes a size of the system to increase, which makes it difficult to apply the latter method to the network operated by a small association such as a company.

Moreover, after connecting to the network, the SIP terminal has to perform an address register process required for utilizing the SIP function and a subscription process to the service to utilize. Furthermore, to strengthen security of the SIP message communicated between the SIP terminal and the SIP proxies, a secured connection is built in most cases by performing authentication for a transport layer security (TLS) and key exchange. Such a SIP system requires more complicated pre-processing for utilizing the service.

SUMMARY OF THE INVENTION

According to one aspect of the present invention, an authentication apparatus connected to at least one communication terminal via a first network, and connected via a second network to at least one server that provides a function to the communication terminal based on setting data received from the communication terminal, the first network and the second network being relayed by a repeater, the authentication apparatus authenticating the communication terminal as a pre-processing of the function provided by the server, the authentication apparatus includes a first storage unit configured to store repeater information that contains repeater ID data for identifying the repeater and processing capability data concerning processing capability of the repeater in a corresponding manner; a first receiving unit configured to receive a first message for requesting to start the authentication from the communication terminal; an acquiring unit configured to acquire the repeater information from the first storage unit when the first receiving unit receives the first message; a processing unit configured to create a second message containing the acquired repeater information; a first transmitting unit configured to transmit the second message to the communication terminal; a second receiving unit configured to receive a third message from the communication terminal, the third message containing a first repeater ID selected by the communication terminal out of repeater IDs contained in the second message by referring to the processing capability data contained in the second message; a third receiving unit configured to receive authentication data from the communication terminal; an authentication unit configured to authenticate the communication terminal based on the authentication data; and a second transmitting unit configured to transmit setting data required for providing the function when the authentication unit decides that the communication terminal is authentic, to any one of a first repeater corresponding to the first repeater ID contained in the third message and a server to which the first repeater relays a communication.

According to another aspect of the present invention, an authentication method in an authentication apparatus connected to at least one communication terminal via a first network, and connected via a second network to at least one server that provides a function to the communication terminal based on setting data received from the communication terminal, the first network and the second network being relayed by a repeater, the authentication apparatus authenticating the communication terminal as a pre-processing of the function provided by the server, the authentication method includes receiving a first message for requesting to start the authentication from the communication terminal; acquiring repeater information from a first storage unit that stores a repeater ID for identifying a repeater and capability data indicative of processing capability of the repeater in a corresponding manner, upon receiving the first message; creating a second message containing the acquired repeater information; transmitting the second message to the communication terminal; receiving a third message from the communication terminal, the third message containing a first repeater ID selected by the communication terminal out of repeater IDs contained in the second message by referring to the processing capability data contained in the second message; receiving authentication data from the communication terminal; authenticating the communication terminal based on the authentication data; and transmitting setting data required for providing the function when the authentication unit decides that the communication terminal is authentic, to any one of a first repeater corresponding to the first repeater ID contained in the third message and a server to which the first repeater relays a communication.

BRIEF DESCRIPTION OF THE DRAWINGS

FIG. 4 is a table for explaining a data structure of a SIP-proxy information table shown in FIG. 3;

FIG. 5 is a table for explaining a correspondence table shown in FIG. 3;

FIG. 6 is a table for explaining a load table shown in FIG. 3;

FIG. 7 is a diagram for explaining a message structure of a PANA-Start-Request message;

FIG. 8 is a diagram for explaining a detailed data structure of a SIP-Proxy-Information AVP;

FIG. 9 is a diagram for explaining a message structure of a PANA-Start-Answer message;

FIG. 10 is a diagram for explaining a detailed data structure of a SIP Register-Information AVP;

FIG. 11 is a diagram for explaining a detailed data structure of a SIP-Service-Information AVP;

DETAILED DESCRIPTION OF THE INVENTION

Exemplary embodiments of the present invention are described in detail below with reference to the accompanying drawings.

An authentication apparatus i.e., an authentication agent, according to an embodiment of the present invention transmits capability data that is used for selecting a specific SIP proxy acting as an outbound proxy to a SIP terminal at a first phase (discovery and handshake phase) of an authentication process, and receives an address to be registered to a location server or a request for subscription to a service of an event server from the SIP terminal at the first phase. After receiving the above information such as the address, the authentication agent performs processes such as an address register process to the location server on behalf of the SIP terminal.

Figure 1:
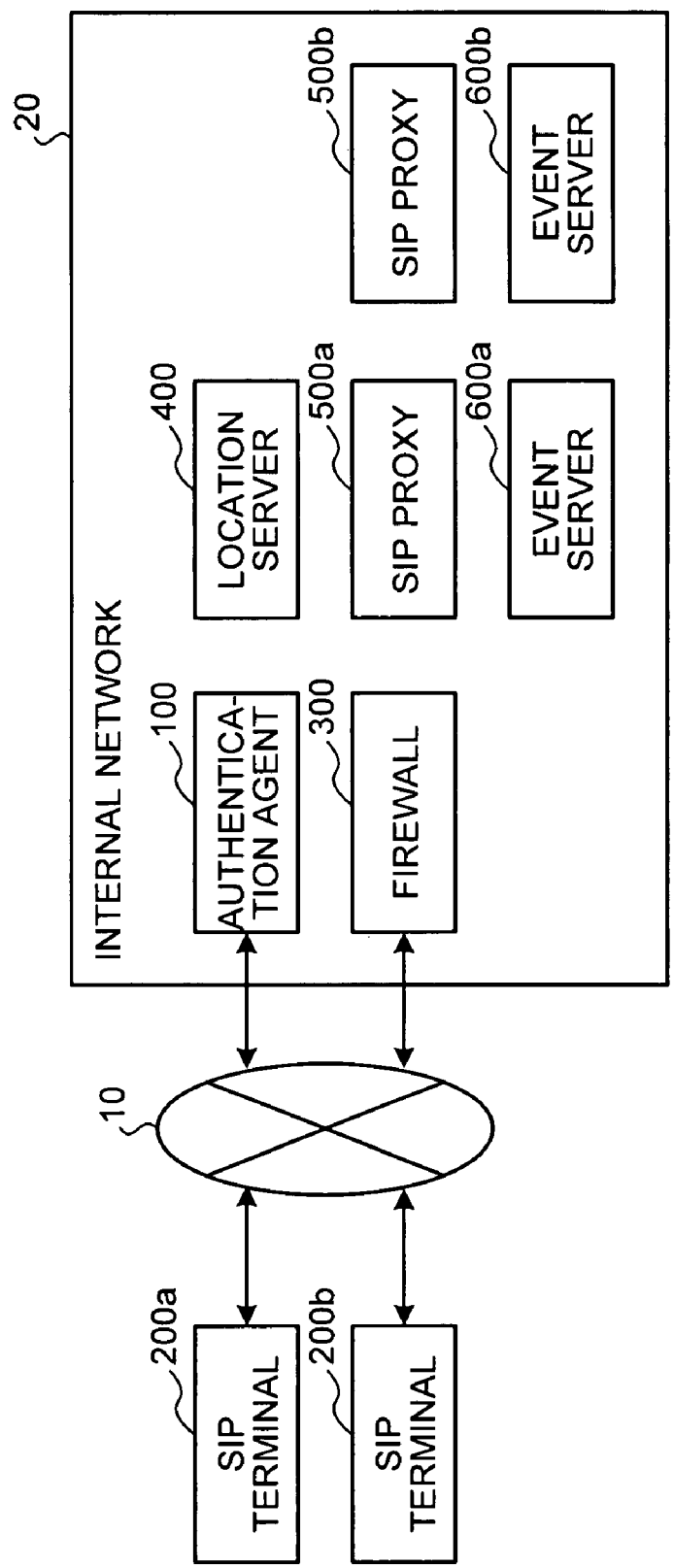
FIG. 1 is a functional block diagram of a communication system including an authentication apparatus according to an embodiment of the present invention.

As shown in FIG. 1, a communication system according to the embodiment includes SIP terminals 200a and 200b, an external network 10, and an internal network 20. The SIP terminals 200a and 200b connect to the internal network 20 via the external network 10.

The SIP terminals 200a and 200b cause an application based on the SIP as a signaling protocol to operate. The SIP terminals 200a and 200b have an identical configuration, and can be simply called as "SIP terminal 200". The number of such terminals is not limited to two. An example of such an application can include an advanced telephone terminal. Configuration of the SIP terminal 200 is described in detail later.

An example of the external network 10 is the Internet. A form of the external network 10, however, is not limited to the Internet. The internal network 20, such as a local area network (LAN), is mainly operated based on a private policy under a specific association, and a plurality of services can be provided to the SIP terminal 200 via the internal network 20. Not limited to the LAN, another network such as a hot-spot network can be used as the internal network 20. The internal network 20 can employ either a wired connection or a wireless connection.

The internal network 20 includes an authentication agent 100, a firewall 300, a location server 400, SIP proxies 500 (SIP proxies 500a and 500b), and event servers 600 (event servers 600a and 600b).

The authentication agent 100 is positioned at a border between the external network 10 and the internal network 20, performs a network access authentication from the SIP terminal 200 to the internal network 20, and adds, when it is determined that the SIP terminal 200 is authentic, the SIP terminal 200 to the internal network 20. It is allowable that the authentication agent 100 performs the access authentication by using an external authentication server (not shown) having an authentication function.

The authentication agent 100 grasps extended function (capability data) of all of the SIP proxies 500 acting on the internal network 20. The authentication agent 100 provides information on the SIP proxies 500 on the internal network 20 and the capability data of the SIP proxies 500 to the SIP terminal 200 at the authentication process. This enables the SIP terminal 200 to select a proper SIP proxy 500 out of the SIP proxies 500 as an outbound proxy to which the SIP terminal 200 is connected.

The authentication agent 100 acquires information such as a SIP address to be registered and an event service to utilize at an event of an authentication success from the SIP terminal 200. The authentication agent 100 performs a key exchange process for exchanging a key with the outbound proxy, a SIP address register process, and an event-service subscription process by using the acquired information on behalf of the SIP terminal 200. Configuration of the authentication agent 100 is described in details later.

The firewall 300 is positioned at a boundary between the external network 10 and the internal network 20, and performs a traffic filtering process for permitting only the authenticated network access to pass. The authentication agent 100 performs the filtering setting on an access from the SIP terminal 200 based on a result of the authentication. In other words, it is assumed that the traffic filtering setting in the firewall 300 can be performed by operating an external device. For performing such setting, a protocol such as simple network management protocol (SNMP) can be used. It is allowable that a single entity functions as both the firewall 300 and the authentication agent 100.

The location server 400 manages an address of the SIP terminal 200 that works on the internal network 20 or addresses of the event servers 600a and 600b. The SIP terminal 200 can use SIP functions after registering its own address to the location server 400.

The address register is usually implemented by exchanging a SIP Register message between the SIP Proxy 500 and SIP Proxy 500 and the SIP terminal 200, and the SIP Proxy 500 stores the address in location server 400. An authentication of the SIP terminal 200 can be performed at the SIP Register message exchange. Such an authentication usually employs a digest authentication by using a WWW-authenticate header of the SIP Register message. It is allowable to perform such an authentication by using an authentication server that is installed separately.

The SIP proxies 500a and 500b are relay servers that transmits a SIP message to the SIP terminal 200 or to another SIP proxy. There is a plurality of the SIP proxies 500 (the SIP proxies 500a and 500b) acting on the internal network 20. The SIP proxies 500 can have an extended function different from each other. Although the extended function supported by the SIP proxy 500 can be a private extension not following the SIP protocol standard, it is assumed that the extended function is recognizable by a Supported header value or an Allow header value.

It is assumed to be possible to set a key used for transport enciphering in the SIP proxies 500a and 500b by operating an external device. An example of such a key is a pre-shared key (PSK) based on the TLS protocol for exchanging a SIP message with a SIP terminal 200 that is specified.

The event servers 600a and 600b provide an event service such as a presence service to the SIP terminal 200. Various SIP services including the presence service are provided in a framework of the event service. The service subscription process is usually performed by exchanging a SIP Subscribe message between the SIP terminal 200 and the event server 600 to start the event service. The event service is provided by exchanging a SIP Notify message. An authentication of the SIP terminal 200 can be performed at the service subscription process by exchanging the SIP Subscribe message. It is allowable to perform such an authentication by using an authentication server that is installed separately.

With the network configuration as shown in FIG. 1, when the SIP terminal 200 connects to the internal network 20 via the external network 10 to utilize the SIP service provided on the internal network 20, it is necessary to perform the access authentication by the authentication agent 100.

The SIP terminal 200 selects a specific one out of the SIP proxies 500 as the outbound proxy (hereinafter, "outbound SIP proxy 500"). It means that the SIP terminal 200 specifies the outbound SIP proxy 500 as a receiver that receives all of SIP messages directly from the SIP terminal 200 and as a transmitter that exclusively transmits a SIP message to the SIP terminal 200.

The SIP terminal 200 selects a SIP proxy that supports a SIP service to utilize as the outbound SIP proxy 500. To select such a SIP proxy, the SIP terminal 200 needs to acquire information on a capability (SIP extended function) of the SIP proxies 500 in advance to refer the information.

Figure 2:
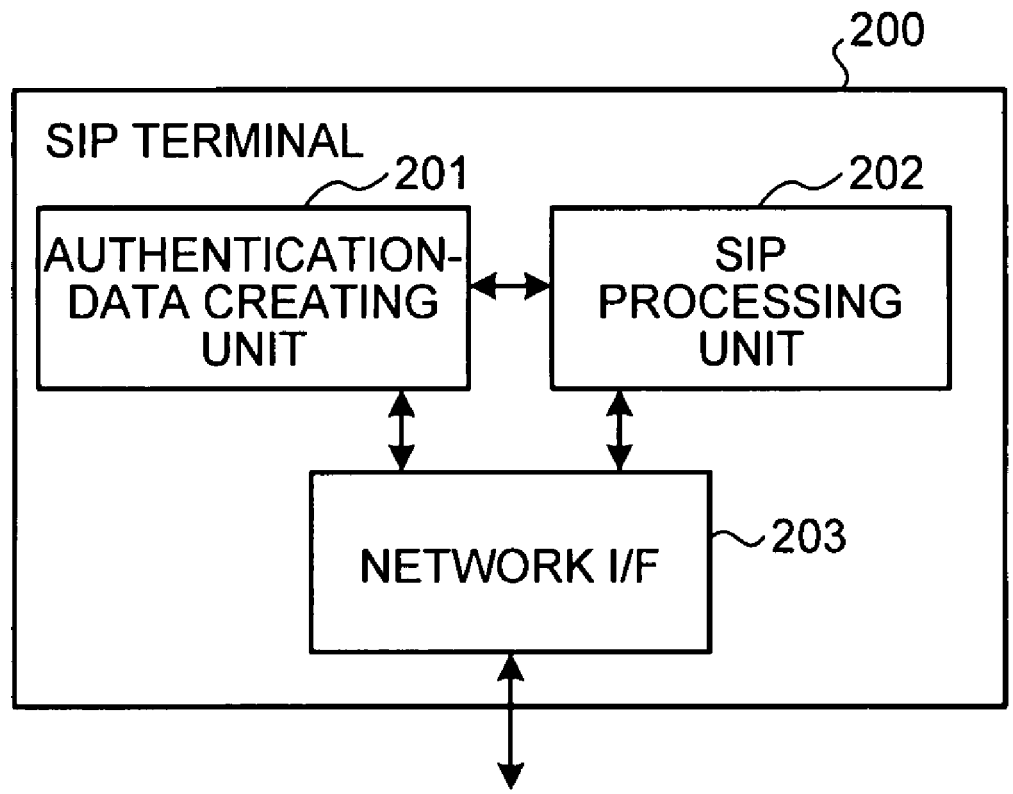
FIG. 2 is a functional block diagram of a SIP terminal shown in FIG. 1.

Configuration of the SIP terminal 200 is described in detail below. As shown in FIG. 2, the SIP terminal 200 includes an authentication-data creating unit 201, a SIP processing unit 202, and a network interface (I/F) 203.

The authentication-data creating unit 201 executes an access authentication protocol when the SIP terminal 200 connects to the internal network 20. Although there is described an example using a protocol for carrying authentication for network access (PANA) as such an access authentication protocol, an available protocol is not limited to the PANA.

The authentication-data creating unit 201 has a function of transmitting information on connectable ones of the SIP proxies 500 acquired from a PANA message to the SIP processing unit 202, and receiving the outbound SIP proxy 500 from the SIP processing unit 202. The authentication-data creating unit 201 creates a PANA message extended to contain information on the outbound SIP proxy 500 and setting data such as an address to be registered, and transmits the extended PANA message to the authentication agent 100. The extended PANA message is described in detail later.

The SIP processing unit 202 creates or interprets a SIP message by operating a SIP application. The SIP processing unit 202 has a function of selecting one out of the SIP proxies 500 notified from the authentication-data creating unit 201 as the outbound SIP proxy 500 and notifying the outbound SIP proxy 500 to the authentication-data creating unit 201.

For example, the SIP processing unit 202 selects one having an extended function necessary for the SIP application as the outbound SIP proxy 500 by referring to the notified SIP-proxy information. It is allowable that the outbound SIP proxy 500 is selected in such a flow that the SIP processing unit 202 presents the notified SIP-proxy information to a user by using a SIP application or the like and one selected by the user as the outbound SIP proxy 500 is transmitted to the authentication-data creating unit 201.

The SIP processing unit 202 also has a function of notifying, at an event of an authentication success, SIP-address register information and event-service subscription information required for an operation of the SIP application to the authentication-data creating unit 201, and receiving a result of the address register process or the service subscription process from the authentication-data creating unit 201.

The network I/F 203 is used for transmitting a message from the SIP terminal 200 to the external network 10. In addition, the network I/F 203 is used for acquiring a packet addressed to the SIP terminal 200 and notifying a message to either the authentication-data creating unit 201 or the SIP processing unit 202 depending on a content of the packet.

Figure 3:
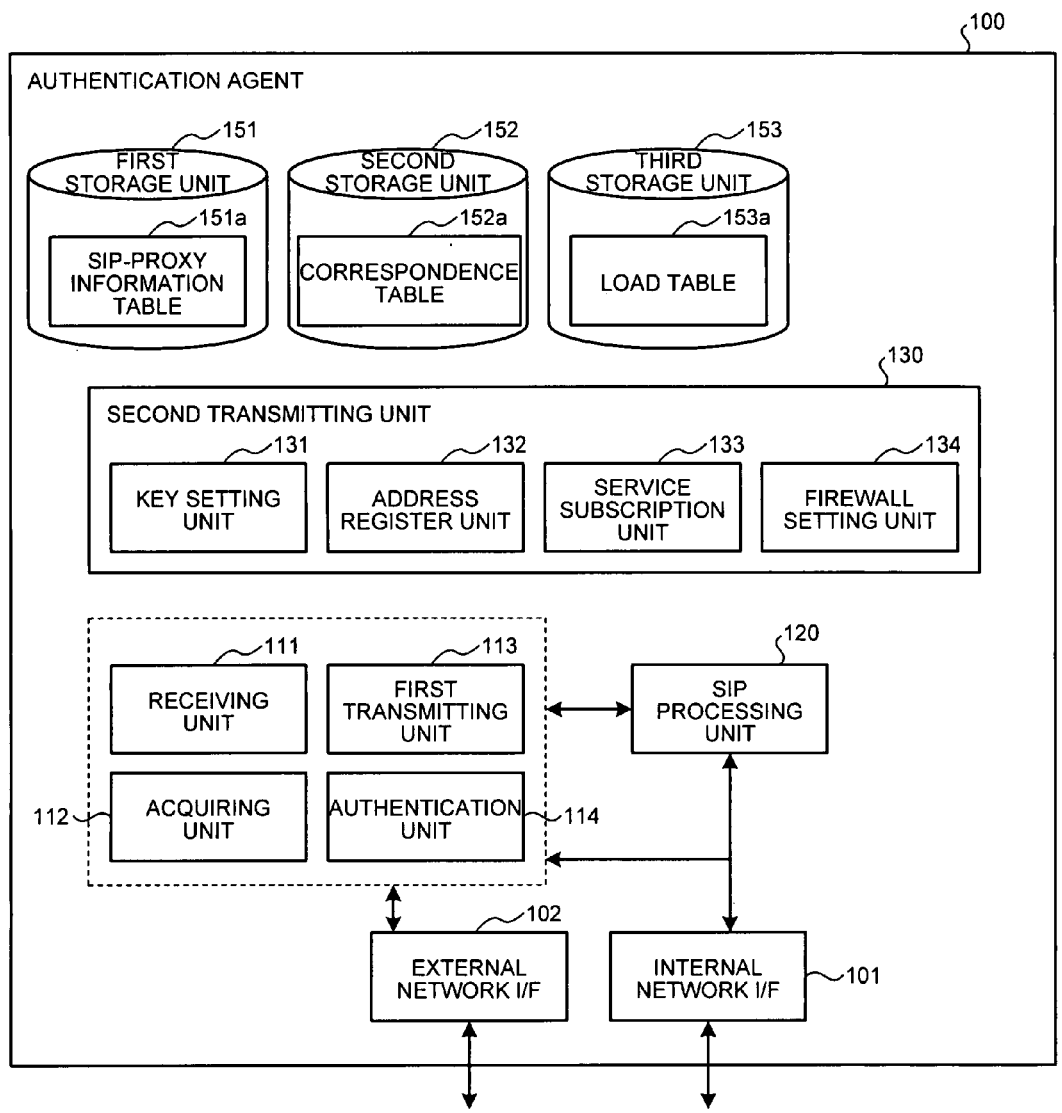
FIG. 3 is a functional block diagram of an authentication agent shown in FIG. 1.

Configuration of the authentication agent 100 is described in details below. As shown in FIG. 3, the authentication agent 100 includes a first storage unit 151, a second storage unit 152, a third storage unit 153, and an internal network I/F 101, and an external network I/F 102 as a main hardware configuration. The authentication agent 100 includes a receiving unit 111, an acquiring unit 112, a first transmitting unit 113, an authentication unit 114, a SIP processing unit 120, and a second transmitting unit 130 as a main software configuration.

The first storage unit 151 stores a SIP-proxy information table 151a containing capability data on the SIP proxies 500. When starting the authentication of the SIP terminal 200, the authentication agent 100 refers to the SIP-proxy information table 151a to acquire capability data on the SIP proxies 500 that is available.

As shown in FIG. 4, the SIP-proxy information table 151a contains a SIP-proxy ID for identifying the SIP proxy 500, and a SIP-proxy name, an internet protocol (IP) address, and capability data in a corresponding manner. The capability data is, for example, a Supported header value or an Allow header value, both acquirable by exchanging a SIP OPTIONS request message with the SIP Proxies 500.

One of the SIP proxies 500 with the SIP-proxy ID of 011 supports an event service identified by "earth", while another of the SIP proxies 500 with the SIP-proxy ID of 012 supports an event service identified by "mercury". It means that the two SIP proxies 500 have the capability different from each other.

The second storage unit 152 stores a correspondence table 152a containing information on the SIP proxies 500 available for the SIP terminal 200. The authentication agent 100 refers to the correspondence table 152a to acquire only SIP-proxy data corresponding to the SIP terminal 200 subject to the authentication from the SIP-proxy information table 151a that contains information on all of the SIP proxies 500.

As shown in FIG. 5, the correspondence table 152a contains SIP-terminal ID for identifying the SIP terminal 200 and SIP-proxy ID corresponding to ones of the SIP proxies 500 available for the SIP terminal 200, in a corresponding manner.

In an example shown in FIG. 5, each of the SIP-terminal IDs has either A or N/A for each of the available SIP-proxy IDs, in which any one of SIP proxies 500 with A is available for the SIP terminal 200.

The third storage unit 153 stores a load table 153a containing load data concerning a processing load on each of the SIP proxies 500. The authentication agent 100 refers to the load table 153a to select such a proper one of the SIP proxies 500 that can help to distribute the load depending on a processing load status and present the proper SIP proxy 500 to the SIP terminal 200.

As shown in FIG. 6, the load table 153a contains SIP-proxy ID and number of connected terminals, in a corresponding manner. The number of connected terminals indicates the number of SIP terminals 200 connected to each of the SIP proxies 500. Other than the number of terminals, it is allowable to employ at least any one of conventionally-used load data concerning a resource such as a consumption amount of a central processing unit (CPU) and a consumption amount of a memory.

To acquire information on the available SIP proxies 500, it is allowable to refer to the SIP-proxy information table 151a and either one of the correspondence table 152a and the load table 153a, or refer to the SIP-proxy information table 151a only.

Any generally-used storage medium can be used as the first storage unit 151, the second storage unit 152, and the third storage unit 153, such as a hard disk drive (HDD), an optical disc, a memory card, and a random access memory (RAM).

The internal network I/F 101 is an interface used by the authentication agent 100 for communicating with devices on the internal network 20. The external network I/F 102 is an interface for connecting the authentication agent 100 to the external network 10 and is used for transmitting or receiving a packet to or from the SIP terminal 200 subject to the authentication.

The receiving unit 111 receives information required for an access authentication based on the PANA (PANA authentication) from the SIP terminal 200 via the external network I/F 102. The receiving unit 111 receives messages such as a PANA-PAA-Discover message for requesting to start the PANA authentication and an extensible authentication protocol (EAP) message containing authentication data used at an authentication and authorization phase of PANA.

The receiving unit 111 also receives a PANA-Start-Answer message extended to contain the outbound SIP proxy 500 that is selected by the SIP terminal 200, the address to be registered to the location server 400, and setting data for the service subscription to be transmitted to the event server 600. The extended PANA-Start-Answer message is described in details later.

Upon the receiving unit 111 receiving the PANA-PAA-Discover message, the acquiring unit 112 acquires the available SIP proxy information from the SIP-proxy information table 151a.

The first transmitting unit 113 transmits various information required for the PANA authentication to the SIP terminal 200 via the external network I/F 102. For example, the first transmitting unit 113 transmits the PANA-Start-Request message, which is a reply from the authentication agent 100 to the PANA-PAA-Discover message, to the SIP terminal 200.

The first transmitting unit 113 also transmits the PANA-Start-Request message extended to contain the SIP-proxy information acquired by the acquiring unit 112 to the SIP terminal 200.

In response to the request from the SIP terminal 200 to start the PANA authentication, the authentication unit 114 decides whether the SIP terminal 200 is authentic by performing the PANA authentication. It is allowable that the authentication unit 114 executes the authentication by issuing a query to an external authentication server. A message using the access authentication protocol is transmitted or received via the external network I/F 102. The authentication unit 114 transmits or receives messages via the internal network I/F 101 such as a message based on an authentication, authorization and accounting (AAA) protocol exchanged at the authentication and a firewall control message exchanged after an event of an authentication success.

At an event of a PANA authentication success, the authentication unit 114 can acquire a key derived by using a PANA specification. The key is used as a pre-shared key for TLS (TLS-PSK) for protecting a SIP transport between the SIP terminal 200 and the outbound SIP proxy 500.

The SIP processing unit 120 creates or interprets a SIP message. Specifically, the SIP processing unit 120 performs a process of exchanging a necessary SIP message at the authentication of the SIP terminal 200 with SIP Proxies 500.

The second transmitting unit 130 transmits on behalf of the SIP terminal 200 various setting data for setting an external device such as the outbound SIP proxy 500. The second transmitting unit 130 includes a key setting unit 131, an address register unit 132, a service subscription unit 133, and a firewall setting unit 134.

The key setting unit 131 sets the TLS-PSK, which is the pre-shared key used for TLS, in the outbound SIP proxy 500 by transmitting the pre-shared key created at the authentication to the outbound SIP proxy 500 by using a secured method such as a simple network management protocol version 3 (SNMPv3) protocol.

The address register unit 132 registers, to the location server 400, an address acquired from the message received from the SIP terminal 200. For example, the SIP processing unit 120 creates a SIP Register message, which is a SIP message used for registering an address, and the address register unit 132 transmits the SIP Register message created by the SIP processing unit 120 to the location server 400 to register the address.

Other than the above method, any method of registering the address can be employed if the method enables the address of the SIP terminal 200 to be added to a database of the location server 400. It is also allowable that the authentication agent 100 receives a PANA message containing the SIP Register message from the SIP terminal 200, extracts the SIP Register message from the message, and performs the address register process by using the extracted SIP register message.

The service subscription unit 133 performs a process for subscribing to a service of the event server 600 by using setting data acquired from the message received from the SIP terminal 200. For example, the SIP processing unit 120 creates a SIP Subscribe message, which is a SIP message used for subscribing to a service, and the service subscription unit 133 transmits the SIP Subscribe message created by the SIP processing unit 120 to the event server 600 to subscribe to the service.

Other than the above method, any method of subscribing to a service can be employed if it is possible to subscribe to a service by adding the setting data on the SIP terminal 200 to a data base of the event server 600. It is also allowable that the authentication agent 100 receives a PANA message containing the SIP Subscribe message from the SIP terminal 200, extracts the SIP Subscribe message, and performs the service subscription process by using the extracted SIP Subscribe message.

The firewall setting unit 134 sets the firewall 300 accessible from the SIP terminal 200 to the internal network 20 depending on a result of the authentication. The firewall setting unit 134 sets the firewall 300 by using, for example, the SNMPv3.

An example of an extended format of the access authentication protocol required for implementing the embodiment is described below. There is described a format of a PANA message based on the PANA as the access authentication protocol. This message format is extended to (1) carry the SIP-proxy information and to (2) carry information required for the SIP address register process and the service subscription process.

1. Carrying the SIP-proxy Information

As described above, the authentication agent 100 provides information on the SIP proxies 500 acting on the internal network 20. The SIP terminal 200 notifies one of the SIP proxies 500 selected as the outbound proxy to the authentication agent 100.

Accordingly, an extended area in which information on the outbound SIP proxy 500 is contained is added to the PANA-Start-Request message and the PANA-Start-Answer message, both of which are exchanged at the first phase (discovery and handshake phase) of initializing a session for the authentication. More particularly, a SIP-Proxy-Information AVP is added to each of the PANA-Start-Request message and the PANA-Start-Answer message as an attribute value pair (AVP) for extension.

The SIP-Proxy-Information AVP contains one SIP-proxy ID, one SIP-proxy name in a form of text, any pieces of the Supported header values that identify an extension to be supported, and any pieces of the Allow header values that identifies a method to be supported.

Because the PANA-Start-Request message is used for presenting the SIP proxies 500 that are available from the authentication agent 100 to the SIP terminal 200, the PANA-Start-Request message can contains a plurality of SIP-Proxy-Information AVPs. Because the PANA-Start-Answer message is used for notifying the outbound SIP proxy 500 from the SIP terminal 200 to the authentication agent 100, the PANA-Start-Answer message contains only one SIP-Proxy-Information AVP.

Structure of the PANA-Start-Request message is described shown in FIG. 7. Structure of the PANA-Start-Answer message is described later in "2. Carrying Information Necessary for the SIP Address Registration and the Service Subscription", because the PANA-Start-Answer message has another extension for the SIP address register and the service subscription.

As shown in FIG. 7, the SIP-Proxy-Information AVP is added to an area following to network setting data as an extended AVP. In FIGS. 7 to 11, a message with an asterisk (*) can be repeated at several times in the message structure.

As shown in FIG. 8, the SIP-Proxy-Information AVP contains a SIP-proxy ID, a SIP-proxy name, a corresponding Supported header value, and a corresponding Allow header value. Corresponding data acquired from the SIP-proxy information table 151a are set as the SIP-proxy ID, the SIP-proxy name, the Supported header value, and the Allow header value to the SIP-Proxy-Information AVP.

2. Carrying Information Necessary for the SIP Address Registration and the Service Subscription At the PANA access authentication, the SIP terminal 200 notifies information required for the SIP address register process and the service subscription process that are performed after an event of the access authentication success to the authentication agent 100.

Accordingly, a SIP-Register-Information AVP and a SIP-Service-Information AVP are additionally added to the PANA-Start-Answer message transmitted from the SIP terminal 200 to the authentication agent 100.

As shown in FIG. 9, the SIP-Register-Information AVP and the SIP-Service-Information AVP are added to an area following to the network setting data in addition to the SIP-Proxy-Information AVP described in "1. Carrying the SIP-proxy Information" as extended AVPs.

As shown in FIG. 10, the SIP-Register-Information AVP contains one address-of-record (AoR) and any pieces of SIP contact addresses. The AoR is a SIP uniform resource identifier (URI) to be registered as an address of the SIP terminal 200.

As shown in FIG. 11, the SIP-Service-Information AVP contains one SIP event-type ID that identifies a type of an event service to registered, one Request-URI related to the event service to be registered, and any pieces of optional messages to utilize the target event service.

Other than the above extension, another extension in such a manner is allowable, that the SIP message to be transmitted at the authentication success by the SIP terminal 200 is transmitted to the authentication agent 100 in a form the entire SIP message to be transmitted at the authentication success contained in a pre-defined AVP.

Although the example using the PANA as the access authentication protocol is described above, not limited to the PANA, it is applicable to any protocol that enables a message to be exchanged between the SIP terminal 200 and the authentication agent 100. In other words, it is possible to exchange a message containing necessary information between devices by adding an extension corresponding to the above AVPs to the message.

A service starting process performed by the authentication agent 100 is described below with reference to FIG. 12.

Figure 12:
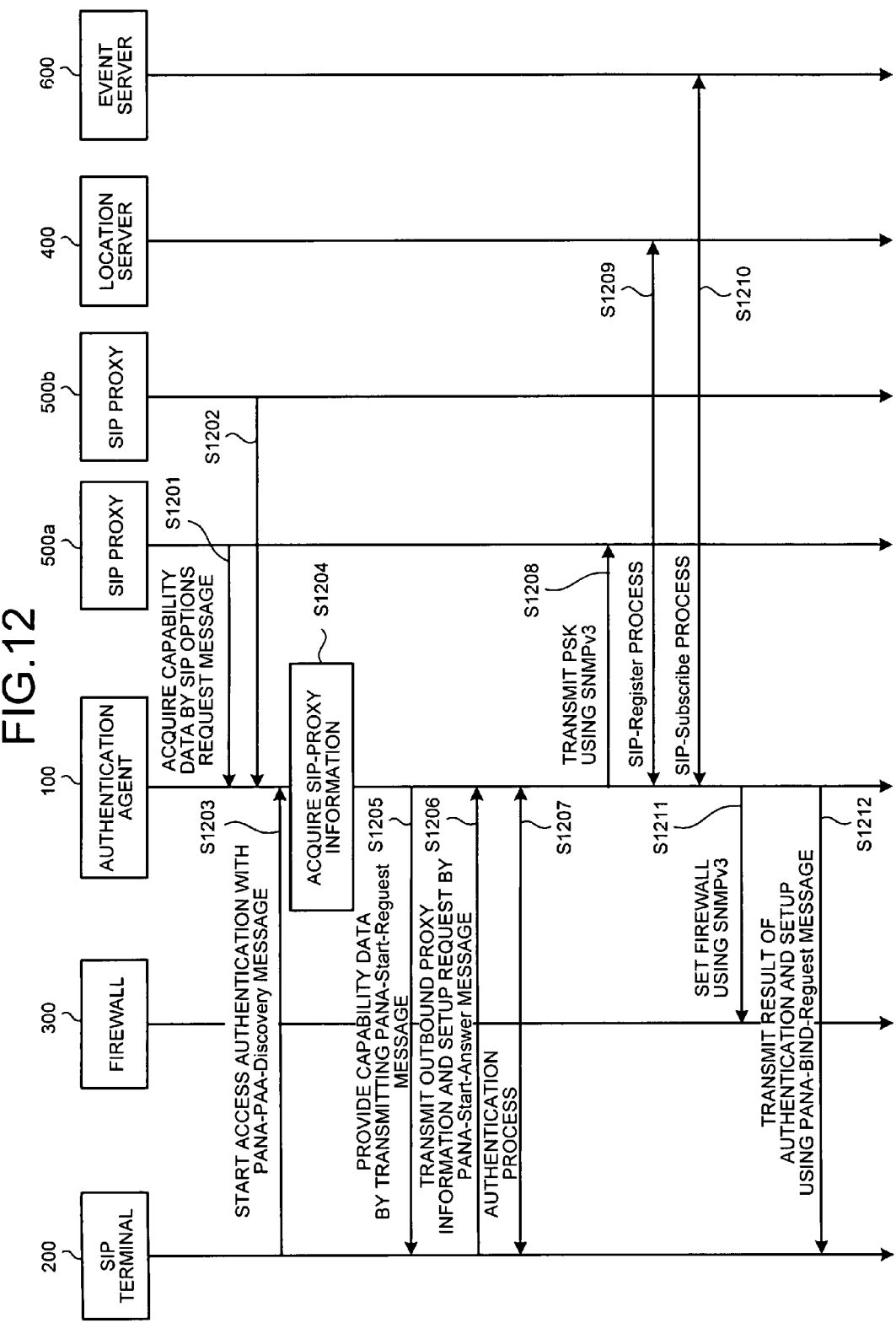
FIG. 12 is a sequence diagram of a general process for causing a service available according to the embodiment.

In an example in FIG. 12, the SIP proxies 500*a* and 500*b* are on the internal network 20, and have "earth" and "mercury" in the Supported header value indicative the SIP extended function. In other words, a SIP-proxy ID of 011 and a SIP-proxy ID of 012 shown in FIG. 4 correspond to the SIP proxy 500*a* and the SIP proxy 500*b*, respectively.

In the example, the SIP proxy 500*a*, which supports "earth", is selected as the outbound proxy 500 by the SIP terminal 200, and "abc@192.168.0.10" and "termA@example.com" are registered to the location server 400 as the contact address and as the AoR, respectively.

The SIP terminal 200 registers two event services, a first event service having an event type ID of "presence" and a Request-URI of "eventA.service.example.com", and a second event service having an event type ID of "pana" and a Request-URI of "eventB.service.example.com".

Firstly, the SIP processing unit 120 of the authentication agent 100 acquires the Supported header value and the Allow header value by exchanging a SIP OPTIONS request message to acquire capability data of the SIP proxies 500*a* and 500*b* (steps S1201 and S1202).

More particularly, the SIP processing unit 120 periodically transmits the SIP OPTIONS request message to the SIP proxies 500 via the internal network I/F 101. The SIP proxies 500 return a SIP OPTIONS response message depending on the SIP protocol specification as a response to the SIP OPTIONS request message. The SIP OPTIONS response message contains the Supported header and the Allow header that correspond to the capability data of the SIP proxy 500. The SIP OPTIONS response message is received via the internal network I/F 101 by the SIP processing unit 120. The SIP processing unit 120 interprets the SIP OPTIONS response message, acquires the SIP-proxy ID, the SIP-proxy name, the Supported header value, and the Allow header value of each of the SIP proxies 500, and stores the acquired data in the SIP-proxy information table 151*a*. Other than the above method, another method such as a manual register by an administrator of the system can be taken as a method of storing the above data in the SIP-proxy information table 151*a*.

In the example, the SIP processing unit 120 acquires the SIP-proxy ID of "011", the IP address of "192.168.1.11", and the Supported header value of "earth" from the SIP proxy 500*a*, and the SIP-proxy ID of "01.2", the IP address of "192.168.1.12", and the Supported header value of "mercury" from the SIP proxy 500*b*.

Then, the authentication-data creating unit 201 of the SIP terminal 200 transmits a PANA-PAA-Discovery message for requesting the authentication agent 100 to start an access authentication (step S1203). The PANA first phase (discovery and handshake phase) starts at this point. It is allowable that the SIP terminal 200 finds an address of the authentication agent 100 by transmitting the PANA-PAA-Discovery message. It is also allowable that the SIP terminal 200 requests an authentication with the extended form according to the embodiment by using the PANA header version data.

When the PANA-PAA-Discovery message is received by the receiving unit 111 of the authentication agent 100, the acquiring unit 112 acquires the SIP-proxy information from the SIP-proxy information table 151*a* (step S1204). In principal, the acquiring unit 112 acquires the SIP-proxy information of all the SIP proxies 500 stored in the SIP-proxy information table 151*a*.

If data corresponding to the SIP terminal 200 that transmits the PANA-PAA-Discovery message is registered in the correspondence table 152*a*, the acquiring unit 112 acquires SIP-proxy IDs of SIP proxies 500 available for the SIP terminal 200 that transmits the PANA-PAA-Discovery message from the correspondence table 152*a* to acquire SIP-proxy information corresponding to the SIP-proxy IDs acquired from the correspondence table 152*a* from the SIP-proxy information table 151*a*.

For example, if a SIP-terminal ID of the SIP terminal 200 that transmits the PANA-PAA-Discovery message is 00112233445577, the acquiring unit 112 acquires the SIP-proxy IDs of 011 and 012 from the correspondence table 152*a* shown in FIG. 5, to acquire the SIP-proxy information corresponding to the SIP-proxy IDs of 011 and 012 from the SIP-proxy information table 151*a*.

It is allowable that if the load data on the SIP proxies 500 is managed in the load table 153*a*, the acquiring unit 112 selects one of the SIP proxies 500 having the smallest processing load to acquire SIP-proxy information corresponding to the SIP proxy 500 having the smallest processing load. It is also allowable that if there are two or more of SIP proxies 500 that support a specific extended function, the acquiring unit 112 selects one having the smallest processing load out of the SIP proxies 500 supporting the specific extended function by referring to the load data.

Then, the authentication unit 114 creates a PANA-Start-Request message containing the acquired SIP-proxy information including the capability data. The first transmitting unit 113 transmits the PANA-Start-Request message to the SIP terminal 200 (step S1205).

It should be noted that it is not necessary for the authentication unit 114 to contain IP addresses of the SIP proxies 500 in the AVP. The authentication unit 114 creates, for example, the PANA-Start-Request message having a SIP-Proxy-Information AVP in which information on the SIP proxies 500*a* and 500*b* is contained.

In the SIP terminal 200, the authentication-data creating unit 201 receives the PANA-Start-Request message, and transfers the SIP-proxy ID, the SIP-proxy name, and the extended function contained in the SIP-Proxy-Information AVP of the PANA-Start-Request message to the SIP processing unit 202. The SIP processing unit 202 selects one of the SIP proxies 500 as the outbound SIP proxy 500 by referring to the transferred SIP-proxy information, and notifies the outbound SIP proxy 500 to the authentication-data creating unit 201.

As described above, while the SIP terminal transmits a request for the capability data to each of the SIP proxies according to the conventional method, the SIP terminal 200 can acquire the capability of the SIP proxies 500 acquired by the authentication agent 100 in advance from a message that is used for the authentication. Therefore, it is possible to reduce the processing load required for acquiring the capability data, and to cancel the authentication process if there is no SIP proxy on the internal network having a required capability.

It is assumed that the SIP processing unit 202 selects the SIP proxy 500*a* as the outbound SIP proxy 500 and notifies the SIP proxy 500*a* to the authentication-data creating unit 201 as described above.

The SIP processing unit 202 can notify to the authentication-data creating unit 201 during access authentication, the AoR and the contact address those are to be performed SIP address registration after succeeding access authentication. Moreover, the SIP processing unit 202 can notify to the authentication-data creating unit 201 during access authentication, information on a Request-URI of the event server 600 that is to be performed SIP service registration after succeeding access authentication and others.

In the example, the SIP processing unit 202 notifies "abc@192.168.0.10" to be registered as the contact address and "termA@example.com" to be registered as the AoR to the authentication-data creating unit 201. The SIP processing unit 202 also notifies the two event services to utilize, the first event service having the event type ID of "presence" and the Request-URI of "eventA.service.example.com", and the second event service having the event type ID of "pana" and the Request-URI of "eventB.service.example.com" to the authentication-data creating unit 201. It is possible to notify to the authentication-data creating unit 201 that a text of, for example, "event B: level 1" is contained in the second event service as a message unique to the second event service.

Upon receives the notice, the authentication-data creating unit 201 creates the PANA-Start-Answer message as shown in FIG. 9 that contains the SIP-Proxy-Information AVP as shown in FIG. 8 having information such as the SIP-proxy ID of the outbound SIP proxy 500, the SIP Register-Information AVP as shown in FIG. 10 having information such as the address to be registered, and the SIP-Service-Information AVP as shown in FIG. 11 having information such as the event service ID to which the SIP terminal 200 subscribes, and transmits the PANA-Start-Answer message to the authentication agent 100 (step S1206).

The authentication unit 114 of the authentication agent 100 receives the PANA-Start-Answer message. When the authentication unit 114 receives the PANA-Start-Answer message successfully, the phase transits from the first phase to a PANA second phase (authentication and authorization phase) at which an authentication of the SIP terminal 200 is performed based on the EAP. At the authentication and authorization phase, PANA authentication messages (such as a PANA-Auth-Request and a PANA-Auth-Answer) are exchanged, and an EAP authentication by using an EAP-Payload AVP is performed (step S1207).

Note that The authentication at step S1207 corresponds to four authentications, that is, (1) an access authentication of the SIP terminal 200, (2) an authentication for the SIP register of the SIP terminal 200, (3) an authentication for the subscription to the event server 600 notified from the SIP terminal 200, and (4) an authentication for building a secure transport between the SIP terminal 200 and the selected outbound SIP proxy 500.

It is allowable that the authentication unit 114 perform the EAP authentication by accessing an authentication server (not shown) on the internal network 20 via the internal network I/F 101. It is also allowable that the authentication unit 114 decides an authentication server to be accessed depending on information contained in the SIP-Proxy-Information AVP, the SIP Register-Information AVP, or the SIP-Service-Information AVP in the PANA-Start-Answer message, that is, the outbound SIP proxy 500 that is selected by the SIP terminal 200 or a type of the event server 600 to be used. It is still also allowable to add the information to the AAA protocol used at the access to the authentication server.

When the PANA and the EAP authentications succeed, the authentication agent 100 acquires a result of the PANA and the EAP authentications of the SIP terminal 200 and a key derived by using the PANA and the EAP. The key is used as a pre-shared key shared by the authentication agent 100 and the SIP terminal 200.

The key setting unit 131 transmits the pre-shared key derived at the authentication process to the SIP proxy 500 contained in the SIP-Proxy-Information AVP, that is, the SIP proxy 500a that is selected by the SIP terminal 200 as the outbound SIP proxy 500 by using a secured method such as the SNMPv3 (step S1208). The selected SIP Proxy 500a, receiving the pre-shared key, sets it as the TLS-PSK for protecting a SIP transport between the SIP terminal 200 and the outbound SIP proxy 500, that is, the SIP proxy 500a.

After the key is transmitted, the address register unit 132 acquires the AoR and the contact address contained by the SIP terminal 200 in the SIP Register-Information AVP, and registers the AoR and the contact address to the location server 400.

More particularly, the address register unit 132 notifies the AoR and the contact address to the SIP processing unit 120. Upon receiving the notice, the SIP processing unit 120 creates a SIP Register message for registering the AoR and the contact address, and transmits a request or receives a response to or from the location server 400 (step S1209). The process at step S1209 corresponds to the SIP register process on behalf of the SIP terminal 200.

In the example, the address register unit 132 registers the AoR of "termA@example.com" and the contact address of "abc@192.168.0.10" to the location server 400 by causing the SIP processing unit 120 to transmit the AoR and the contact address.

The SIP processing unit 120 can store the registered address and a registered expired time contained in the SIP Register response message into a storage unit (not shown). The expired time is usually indicated by an expires parameter contained in Expires header or the Contact header of the SIP Register response message.

The service subscription unit 133 acquires the event type ID, the Request-URI, and the message to utilize the service, those contained by the SIP terminal 200 in the SIP-Service-Information AVP, and performs the register process to the event server 600.

More particularly, the service subscription unit 133 notifies the event type ID, the Request-URI, and the unique message to utilize the service to the SIP processing unit 120. Upon receiving the notice, the SIP processing unit 120 creates a SIP Subscribe message for subscribing to the service based on the notified information, and transmits a request or receives a response to or from the event server 600 (step S1210). The process at step S1210 corresponds to the SIP subscription process on behalf of the SIP terminal 200.

In the example, the service subscription unit 133 registers the first event service having the event type ID of "presence" to one of the event servers 600 having the Request-URI of "eventA.service.example.com", and the second event service having the event type ID of "pana" to another event server 600 having the Request-URI of "eventB.service.example.com". The text of "eventB: level 1" is added to a SIP session description protocol (SDP) of the second event service as the unique message.

The SIP processing unit 120 can store the registered service subscription data and a registered expired time of the service contained in the SIP Subscribe response message into a storage unit (not shown). The expired time of the service is usually indicated by the Expires header of the SIP Subscribe response message.

The firewall setting unit 134 sets the firewall 300 via the internal network I/F 101 depending on a result of the authentication, that is, sets the firewall 300 accessible or inaccessible from the SIP terminal 200 to the internal network 20 (step S1211).

The authentication unit 114 transmits a PANA-Bind-Request message to the SIP terminal 200 via the external network I/F 102 (step S1212). The PANA-Bind-Request message contains a result of the authentication of the SIP terminal 200. The PANA-Bind-Request message can also contain a result of the SIP address register and the service subscription or error information.

Upon receiving the PANA-Bind-Request message, it is allowable that the authentication-data creating unit 201 of the SIP terminal 200 notifies the result of the SIP address register and the service subscription or the error information to the SIP processing unit 202. With the above information, the SIP processing unit 202 can check that the SIP address register process and the service subscription process are completed by the authentication agent 100.

The SIP processing unit 202 sets the TLS-PSK for protecting a SIP transport between the SIP terminal 200 and the outbound SIP proxy 500, that is, the SIP proxy 500a.

As a result of the above sequence, the SIP terminal 200 is in a state that the TLS-PSK exchange process is completed, the SIP address register process is completed with the specified address, and the service subscription process on the specified event server 600 is completed.

The authentication agent 100 can perform the SIP address register process and the service subscription process repeatedly at the registered expired time or a predetermined timing based on the SIP address register data and the event service subscription data stored in the storage unit (not shown) to update the registered expired time of the SIP address or the service.

When the SIP terminal 200 and the authentication agent 100 enter into a PANA termination phase at which the PANA session terminates, that is, the PANA authentication state terminates, a process for deregistration of the SIP address or unsubscription of the event service stored in the storage unit can be performed. At the process of deregistration or unsubscription, the data on the address or the event service can be deleted from the storage unit.

As shown at steps S1208 to S1210, the authentication agent 100 performs the key setting, the address register, and the service subscription after an event of the authentication success on behalf of the SIP terminal 200. This makes it possible to improve efficiency of the pre-processing starting from the access to the network and ending at a start of the event service.

Figure 13:
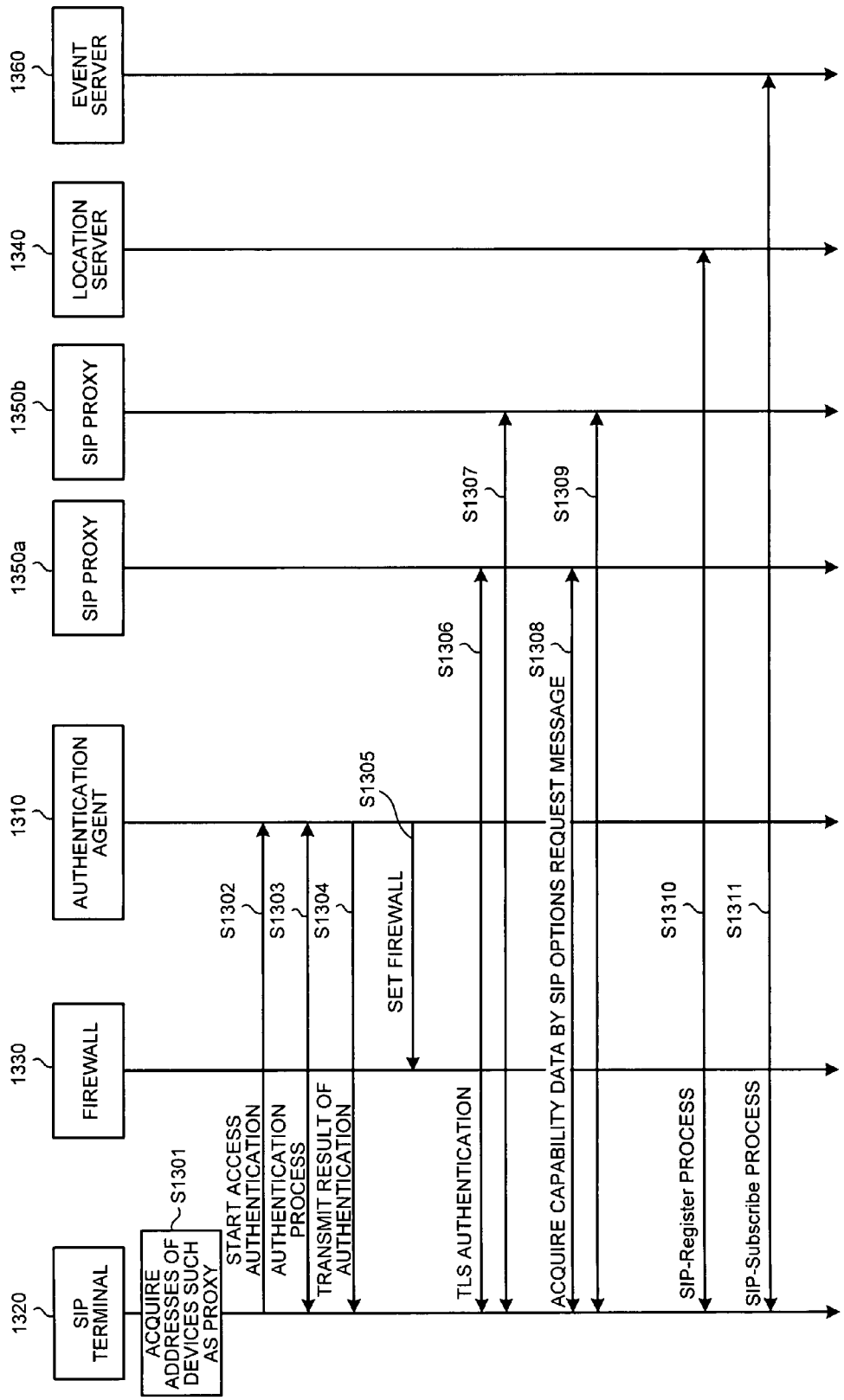
FIG. 13 a sequence diagram of a general process for causing a service available according to a conventional technique.

A service starting process performed by a SIP terminal and an authentication agent according to the conventional technique is described below with reference to FIG. 13.

Each of a SIP terminal 1320, a firewall 1330, an authentication agent 1310, a location server 1340, SIP proxies 1350 (a SIP proxy 1350a and a SIP proxy 1350b), and an event server 1360 has a general function that is used conventionally.

The SIP terminal 1320 needs to acquire in advance addresses of devices to be access such as the authentication agent 1310, the location server 1340, the SIP proxies 1350, and the event server 1360 by employing, for example, the address acquiring method using the DNS (step S1301).

The SIP terminal 1320 requests the authentication agent 1310 to start an access authentication (step S1302).

The authentication agent 1310 performs the authentication of the SIP terminal 1320 (step S1303). At the authentication, the authentication agent 1310 can issue a query to an authentication server separately installed on the network.

When the authentication agent 1310 determined that the SIP terminal 1320 is authentic, the SIP terminal 1320 is given a permission to access to the network (step S1304). By setting the firewall 1330 (step S1305) associated with the permission, the SIP terminal 200 can access to the network.

Preparing for exchange of a SIP message with each of the SIP proxies 1350, the SIP terminal 1320 performs an authentication for the transport protocol such as the TLS and a key exchange protocol to build a secured connection (steps S1306 and S1307).

To select an outbound proxy having a proper function, the SIP terminal 1320 issues a query for capability data to each of the SIP proxies 1350 working on the network (steps S1308 and 1309). It is necessary to acquire addresses of the SIP proxies working on the network in advance.

The capability data can be acquired by exchanging a SIP OPTIONS message. The SIP terminal 1320 issues the query for the capability data to all of the SIP proxies 1350 working on the network, and selects a specific one of SIP proxies 1350 as the outbound proxy to which the SIP terminal 1320 hopes to be connected.

The SIP terminal 1320 requests the location server 1340 to register the SIP address (SIP Register message exchange, step S1310). If necessary, the location server 1340 performs an authentication associated with the address register of the SIP terminal 1320 by additionally exchanging a SIP Register message with a WWW-Authentication header.

To utilize a SIP service via the network to which the SIP terminal 1320 connected, the SIP terminal 1320 performs a service subscription process on the event server 1360 related to the SIP service (step S1311). If there is a plurality of services to utilize, the SIP terminal 1320 needs to perform the service subscription process on a plurality of event servers 1360 corresponding to the services to utilize.

The service subscription process can be performed by exchanging a SIP Subscribe message. It is necessary that the SIP terminal 1320 acquires in advance a type of the event server 1360 and the address of the event server 1360. Together with the service subscription process, a process of authenticating the SIP terminal 1320 required for the SIP service subscription can be performed.

As described above, the separation of the authentication process, the address register process, and the service subscription process in the conventional technique causes a waste in the pre-processing to utilize the service such as acquiring the capability data by the SIP terminal 1320 on each of the SIP proxies 1350 after the authentication. Moreover, there is still a room for improvement with regard to the process of acquiring information in advance such as the address.

In the authentication apparatus according to the embodiment, the authentication agent can transmit the capability data on the SIP proxies to the SIP terminal at the first phase of the authentication, and the SIP terminal can transmit the address to be registered and the information required for requesting a service subscription to the authentication agent at the first phase. Moreover, the authentication agent that receives the above information such as the address can perform the processes such as the address register process on behalf of the SIP terminal. This makes it possible to build a connection between the SIP terminal and the proper SIP proxy in an effective manner, and to shorten and streamline the pre-processing including the authentication process required for utilizing the SIP function.

More particularly, selecting the outbound proxy connected to the SIP terminal is facilitated. Moreover, it is not necessary for the SIP terminal to acquire the addresses of devices such as the SIP proxies in advance. Still moreover, the SIP address register process, WWW-Authenticate process occurring together with the SIP address register, and the event service subscription process, those performed by the SIP terminal according to the conventional technique, can be simpler and integrated with the network access authentication process.

Figure 14:
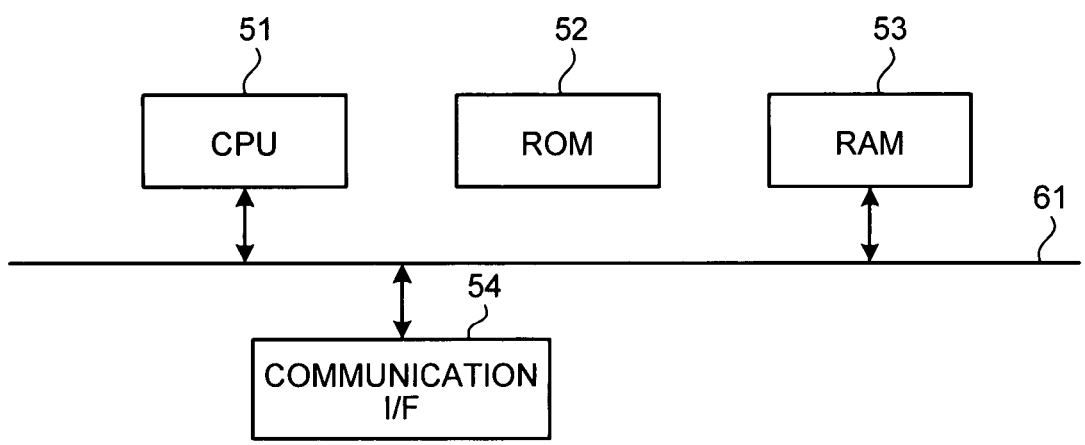
FIG. 14 is a schematic diagram of a hardware configuration of the authentication apparatus according to the embodiment.

The hardware configuration of the authentication apparatus according to the embodiment is described with reference to FIG. 14.

The authentication apparatus according to the embodiment includes, as the hardware configuration using an ordinal computer, a control unit such as a central processing unit (CPU) 51, a storage unit such as a read only memory (ROM) 52 and a RAM 53, a communication I/F 54 that makes a communication by connecting to a network, an external storage unit (not shown) such as an HDD and a compact disc (CD) drive, a display unit (not shown), an input unit (not shown) such as a keyboard and a mouse, and a bus 61 that connect each of the units.

An authentication program executed by the authentication apparatus can be stored, in a form of a file that is installable and executable on a computer, in a recording medium readable by the computer, such as a compact disk-read only memory (CD-ROM), a flexible disk (FD), a compact disk-recordable (CD-R), and a digital versatile disk (DVD).

On the other hand, the authentication program can be stored in another computer connected to the computer via a network such as the Internet, and downloaded to the computer via the network. The authentication program can be delivered or distributed via a network such as the Internet.

The authentication program can be delivered or distributed, for example, in a state preinstalled into a recording medium such as a ROM.

The authentication program is, for example, made up of modules that implement the units of the authentication agent, such as the receiving unit, the acquiring unit, the first transmitting unit, the authentication unit, the SIP processing unit, and the second transmitting unit, as software. When the CPU 51 (processor) reads the authentication program from the recording medium and executes the read authentication program, the above modules are loaded and created on a main memory thereby implementing the units of the authentication agent.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An authentication apparatus connectable to at least one communication terminal via a first network, connected via a second network to at least one server that provides a function to the communication terminal based on setting data received from the communication terminal, and connected via the second network to a plurality of repeaters that relay the first network and the second network, the authentication apparatus authenticating the communication terminal as a pre-processing of the function provided by the server, the authentication apparatus comprising:

a first storage unit configured to store a plurality of pieces of repeater information, each piece of the repeater information containing a repeater ID and processing capability information of one of the plurality of repeaters connected via the second network;

a first receiving unit configured to receive a first message for requesting to start an authentication from the communication terminal connected via the first network;

an acquiring unit configured to acquire the plurality of pieces of repeater information from the first storage unit when the first receiving unit receives the first message;

a processing unit configured to create a second message containing the acquired plurality of pieces of repeater information;

a first transmitting unit configured to transmit the second message to the communication terminal;

a second receiving unit configured to receive a third message from the communication terminal, the third message containing a first repeater ID selected by the communication terminal out of the plurality of repeater IDs contained in the second message by referring to the plurality of pieces of processing capability information contained in the second message;

a third receiving unit configured to receive authentication data for authenticating from the communication terminal;

an authentication unit configured to authenticate the communication terminal based on the authentication data; and a second transmitting unit configured to transmit setting data required for providing the function when the authentication unit decides that the communication terminal is authentic, to one of a first repeater corresponding to the first repeater ID contained in the third message and a server to which the first repeater relays a communication.

2. The apparatus according to claim 1, wherein
the server includes an address management server that manages an address of the communication terminal,
the second receiving unit is configured to receive the third message containing the first repeater ID and the address of the communication terminal to be registered to the address management server, and
the second transmitting unit is configured to transmit the address contained in the third message to the address management server as the setting data.

3. The apparatus according to claim 1, wherein
the server includes an event server that provides an event service to the communication terminal,
the second receiving unit is configured to receive the third message containing the first repeater ID and a function ID that identifies the function to be provided by the event server, and
the second transmitting unit is configured to transmit a fourth message containing a request to utilize the function corresponding to the function ID contained in the third message to the event server as the setting data.

4. The apparatus according to claim 1, wherein
the authentication unit is configured to create a key data that is used for a communication between the first repeater and the communication terminal, and
the second transmitting unit is configured to transmit the key data to the first repeater corresponding to the first repeater ID contained in the third message as the setting data, when the authentication unit decides that the communication terminal is authentic.

5. The apparatus according to claim 1, further comprising:
a second storage unit configured to store a terminal ID for identifying the communication terminal and the first repeater ID, wherein
the acquiring unit is configured to acquire from the second storage unit the repeater ID corresponding to the terminal ID of the communication terminal that receives the first message, and acquires repeater information corresponding to the acquired repeater ID from the first storage unit.

6. The apparatus according to claim 1, further comprising:
a third storage unit configured to store the repeater ID of the repeater and load data concerning processing load of the repeater, wherein
the acquiring unit is configured to acquire the load data from the third storage unit, to acquire a repeater ID of a repeater that has a smallest processing load based on the acquired load data, and to acquire repeater information corresponding to the acquired repeater ID from the first storage unit.

7. The apparatus according to claim 6, wherein
the third storage unit is configured to store the repeater ID and the load data as a number of communication terminals to which the repeater relays a communication, and
the acquiring unit is configured to acquire a repeater ID of a repeater that has a smallest number of communication terminals connected thereto as the repeater ID from the third storage unit, and to acquire the repeater information corresponding to the acquired repeater ID from the first storage unit.

8. The apparatus according to claim 1, wherein the first transmitting unit is configured to transmit the second message containing the plurality of pieces of repeater information to the communication terminal as a response message to the first message.

9. The apparatus according to claim 8, wherein the second receiving unit is configured to receive the third message containing the first repeater ID from the communication terminal as a response message to the second message.

10. The apparatus according to claim 1, wherein
the first receiving unit is configured to receive as the first message from the communication terminal a protocol for carrying authentication for network access (PANA)-authentication agent (PAA)-Discover message based on the PANA,
the first transmitting unit is configured to transmit as the second message to the communication terminal a PANA-Start-Request message based on the PANA,
and the second receiving unit is configured to receive as the third message from the communication terminal a PANA-Start-Answer message based on the PANA.

11. The apparatus according to claim 1, wherein
the first storage unit is configured to store the plurality of pieces of repeater information, each piece of the repeater information containing the repeater ID of the repeater, wherein the repeater is a proxy server based on a session initiation protocol (SIP) and the processing capability information of one of the plurality of repeaters, and
the second transmitting unit is configured to transmit the setting data to the server to which a proxy server corresponding to the first repeater ID contained in the third message relays a communication.

12. The apparatus according to claim 11, wherein
the second receiving unit is configured to receive the third message containing the first repeater ID and the address of the communication terminal to be registered to a location server based on the SIP, and
the second transmitting unit is configured to transmit the address contained in the third message to the location server as the setting data.

13. The apparatus according to claim 12, wherein the second transmitting unit is configured to transmit the address contained in the third message to the location server by transmitting a register message based on the SIP to the location server.

14. The apparatus according to claim 11, wherein
the second receiving unit is configured to receive the third message containing the first repeater ID and the function ID of the server that is an event server providing the function available based on the SIP, and
the second transmitting unit is configured to transmit the function ID contained in the third message to the event server as the setting data.

15. The apparatus according to claim 14, wherein the second transmitting unit is configured to transmit a subscribe message based on the SIP for requesting to utilize the function corresponding to the function ID contained in the third message to the event server.

16. The apparatus according to claim 11, wherein
the authentication unit is configured to create key data for a transport layer security (TLS) used for a communication between the repeater and the communication terminal, and
the second transmitting unit is configured to transmit the key data to the first server when the authentication unit decides that the communication terminal is authentic.

17. An authentication method in an authentication apparatus connectable to at least one communication terminal via a first network, connected via a second network to at least one server that provides a function to the communication terminal based on setting data received from the communication terminal, and connected via the second network to a plurality of repeaters that relay the first network and the second network, the authentication apparatus authenticating the communication terminal as a pre-processing of the function provided by the server, the authentication method comprising:
receiving a first message for requesting to start an authentication from the communication terminal connected via the first network;
acquiring a plurality of pieces of repeater information from a first storage unit that stores the plurality of pieces of repeater information, each piece of repeater information containing a repeater ID and processing capability information of one of the plurality of repeaters connected via the second network, upon receiving the first message;
creating a second message containing the acquired plurality of pieces of repeater information;
transmitting the second message to the communication terminal;
receiving a third message from the communication terminal, the third message containing a first repeater ID selected by the communication terminal out of the plurality of repeater IDs contained in the second message by referring to the plurality of pieces of processing capability information contained in the second message;
receiving authentication data for authenticating from the communication terminal;
authenticating the communication terminal based on the authentication data; and
transmitting setting data required for providing the function when the authentication unit decides that the communication terminal is authentic, to one of a first repeater corresponding to the first repeater ID contained in the third message and a server to which the first repeater relays a communication.

18. A computer program product having a non-transitory computer readable medium including programmed instructions, wherein the instructions for authenticating a communication terminal as a pre-processing of the function to be provided by a server, when executed by a computer connectable to at least one communication terminal via a first network, connected via a second network to at least one server that provides a function to the communication terminal based on setting data received from the communication terminal, and connected via the second network to a plurality of repeaters that relay the first network and the second network, cause the computer to perform:

receiving a first message for requesting to start an authentication from the communication terminal connected via the first network;

acquiring a plurality of pieces of repeater information from a first storage unit that stores the plurality of pieces of repeater information, each piece of repeater information containing a repeater ID and processing capability information of one of the plurality of repeaters connected via the second network, upon receiving the first message;

creating a second message containing the acquired plurality of pieces of repeater information;

transmitting the second message to the communication terminal;

receiving a third message from the communication terminal, the third message containing a first repeater ID selected by the communication terminal out of the plurality of repeater IDs contained in the second message by referring to the plurality of pieces of processing capability information contained in the second message;

receiving authentication data for authenticating from the communication terminal;

authenticating the communication terminal based on the authentication data; and transmitting setting data required for providing the function when the authentication unit decides that the communication terminal is authentic, to one of a first repeater corresponding to the first repeater ID contained in the third message and a server to which the first repeater relays a communication.

* * * * *